US011974170B2

(12) United States Patent
Jiang et al.

(10) Patent No.: US 11,974,170 B2
(45) Date of Patent: Apr. 30, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 301 days.

(21) Appl. No.: 17/523,940

(22) Filed: Nov. 11, 2021

(65) Prior Publication Data

US 2022/0070739 A1 Mar. 3, 2022

Related U.S. Application Data

(63) Continuation of application No. PCT/CN2020/090838, filed on May 18, 2020.

(30) Foreign Application Priority Data

Jun. 4, 2019 (CN) .......................... 201910481974.9

(51) Int. Cl.
*H04W 28/26* (2009.01)
*H04L 5/00* (2006.01)
(52) U.S. Cl.
CPC ........... *H04W 28/26* (2013.01); *H04L 5/0007* (2013.01); *H04L 5/0053* (2013.01)
(58) Field of Classification Search
CPC ....... H04W 28/26; H04L 5/007; H04L 5/0053
(Continued)

(56) References Cited

U.S. PATENT DOCUMENTS

2015/0382262 A1 12/2015 Cho
2019/0082427 A1* 3/2019 Kim .................. H04W 72/0446
(Continued)

FOREIGN PATENT DOCUMENTS

| CN | 105284143 A | 1/2016 |
| CN | 109429315 A | 3/2019 |
| WO | 2011154612 A1 | 12/2011 |

OTHER PUBLICATIONS

ISR received in application No. PCT/CN2020/090838 dated Jun. 23, 2020.

*Primary Examiner* — Anthony Mejia

(57) ABSTRACT

The present disclosure provides a method and a device in a node used for wireless communications. A first node performs channel detection in a first time window to determine a candidate time-frequency resource pool and then receives a first signaling, the first signaling being used to determine a first time-frequency resource set; and transmits a target signaling, the target signaling being used for reserving a candidate time-frequency resource set; the candidate time-frequency resource pool comprises the candidate time-frequency resource set; the candidate time-frequency resource set is reserved for transmission of a first TB; the channel detection is related to the first TB's type. Through designing the present disclosure manages to associate time-frequency resources covered by the channel detection with the first TB's type or duration, thus enhancing the performance of channel detection, which further optimizes sidelink transmission performance and efficiency.

20 Claims, 5 Drawing Sheets

(58) Field of Classification Search
USPC .......................................................... 370/330
See application file for complete search history.

(56) References Cited

U.S. PATENT DOCUMENTS

| | | |
|---|---|---|
| 2019/0191461 A1* | 6/2019 | Lee ..................... H04W 76/28 |
| 2019/0268889 A1* | 8/2019 | Kim ..................... H04L 5/0053 |
| 2019/0281592 A1* | 9/2019 | Liu .................... H04L 27/0006 |
| 2020/0068563 A1* | 2/2020 | Wu ..................... H04W 72/21 |
| 2021/0014832 A1* | 1/2021 | Liu ..................... H04L 1/1845 |
| 2022/0077970 A1* | 3/2022 | Wu ..................... H04L 1/1896 |

* cited by examiner

METHOD AND DEVICE IN NODES USED FOR WIRELESS COMMUNICATION

CROSS REFERENCE TO RELATED APPLICATIONS

This application is a continuation of International Application No. PCT/CN2020/090838, filed May 18, 2020, claims the priority benefit of Chinese Patent Application No. 201910481974.9, filed on Jun. 4, 2019, the full disclosure of which is incorporated herein by reference.

BACKGROUND

Technical Field

The present disclosure relates to transmission methods and devices in wireless communication systems, and in particular to a method and device for channel sensing in sidelink in IoT or V2X system.

Related Art

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. In the current V2X system, the terminal equipment is supported in selecting a sub-channel with less interference through channel sensing to be used for transmission of a Physical Sidelink Shared Channel (PSSCH).

The discussions around NR V2X at present are focused on whether to support different priorities of data transmissions in sidelink, thereby responding to different application scenarios.

SUMMARY

In a V2X system in Rel-13/14, a terminal can autonomously determine time-frequency resources occupied by a Physical Sidelink Control Channel (PSCCH) and a PSSCH through sensing of the sub-channel occupancy. Such channel sensing is performed by detecting a PSCCH and measuring a Demodulation Reference Signal (DMRS) on a PSSCH scheduled by a PSCCH to obtain a result of channel sensing, and the result is used for long-term scheduling which is similar to Semi-Persistent Scheduling (SPS). In a future NR V2X system, support shall be provided for both long-term data and short-term data targeting different requirements as well as a Preemption mechanism which is similar to that in 5G NR.

In response to the above emerging application scenarios and requests, a solution is herein proposed by the present disclosure. It should be noted that the embodiments of a first node, a second node and a third node and a fourth node of the present disclosure and the characteristics in the embodiments may be applied to a base station if no conflict is incurred. In the case of no conflict, the embodiments of the present disclosure and the characteristics in the embodiments may be combined with each other arbitrarily.

The present disclosure provides a method in a first node for wireless communications, comprising:
  performing channel detection in a first time window to determine a candidate time-frequency resource pool;
  receiving a first signaling, the first signaling being used to determine a first time-frequency resource set; and
  transmitting a target signaling, the target signaling being used to reserve a candidate time-frequency resource set;
  herein, the candidate time-frequency resource pool comprises the candidate time-frequency resource set; time-domain resources occupied by the first time-frequency resource set belong to the first time window; the candidate time-frequency resource set is reserved for transmission of a first transport block (TB); whether the channel detection comprises a detection on the first time-frequency resource set is related to a type of the first TB, or whether the channel detection comprises a detection on the first time-frequency resource set is related to a duration of the first time window in time domain.

In one embodiment, the above method is advantageous in that by associating time-frequency resources comprised by channel sensing, that is, time-frequency resources comprised by the channel detection, with the type of the first TB or the length of the first time window, one can determine the time-frequency resources actually belonging to the channel sensing flexibly according to the type of the first TB, thus avoiding the inaccuracy of sensing result caused by the introduction of inappropriate time-frequency resource in the sensing.

In one embodiment, the above method is advantageous in that when the first TB serves long-term scheduling while the first time-frequency resource set serves short-term scheduling, the impact of radio signals on the first time-frequency resource set shall not be considered in channel detection, for the avoidance of a negative effect caused by burst traffics on resources reservation for long-term traffics, thus enhancing the spectrum efficiency; when the first TB serves short-term scheduling, there will be higher demand for transmission reliability, and then channel detection will take into account the effect of radio signals on the first time-frequency resource set with a view to improving the transmission robustness of the first TB.

In one embodiment, the essence of the above method lies in that the first time-frequency resource set is over-written by the first signaling, or the first time-frequency resource set is preempted by the first signaling, thus whether the first time-frequency resource set belongs to burst traffics will affect whether it serves as time-frequency resources for sensing, and consequently, contributing to an increase of the accuracy and effectiveness of channel sensing.

According to one aspect of the present disclosure, the above method is characterized in that the type of the first TB is related to a time-domain duration of the candidate time-frequency resource set.

In one embodiment, characteristics of the above method lie in that the time-domain duration of the candidate time-frequency resource set reflects a performance index for the first TB, so, for long-term transmission, burst traffics shall not be calculated during sensing; while for short-term transmission, burst traffics are considered by sensing.

According to one aspect of the present disclosure, the above method is characterized in comprising:
  determining the candidate time-frequency resource set from the candidate time-frequency resource pool;

herein, the candidate time-frequency resource pool comprises K1 second-type time-frequency resource sets, and the candidate time-frequency resource set is a best one of the K1 second-type time-frequency resource sets.

According to one aspect of the present disclosure, the above method is characterized in comprising:
receiving a second signaling;
herein, the second signaling is used for reserving the first time-frequency resource set.

In one embodiment, characteristics of the above method lie in that the second signaling is a long-term resource reservation indicator; the first signaling in the present disclosure re-schedules the first time-frequency resource set, or the first signaling preempts the first time-frequency resource set; thus it is the short-term or burst traffics that are currently transmitted on the first time-frequency resource set.

According to one aspect of the present disclosure, the above method is characterized in comprising:
transmitting a first signal;
herein, the first TB is used to generate the first signal, the first signal being transmitted in the candidate time-frequency resource set.

The present disclosure provides a method in a second node for wireless communications, comprising:
receiving a target signaling, the target signaling being used for reserving a candidate time-frequency resource set;
herein, a transmitter of the target signaling performs channel detection in a first time window to determine a candidate time-frequency resource pool, and the candidate time-frequency resource set belongs to the candidate time-frequency resource pool; the transmitter of the target signaling also receives a first signaling, the first signaling being used to determine a first time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

According to one aspect of the present disclosure, the above method is characterized in that the type of the first TB is related to a time-domain duration of the candidate time-frequency resource set.

According to one aspect of the present disclosure, the above method is characterized in that the candidate time-frequency resource pool comprises K1 second-type time-frequency resource sets, and the candidate time-frequency resource set is a best one of the K1 second-type time-frequency resource sets.

According to one aspect of the present disclosure, the above method is characterized in comprising:
receiving a first signal;
herein, the first TB is used to generate the first signal, the first signal being transmitted in the candidate time-frequency resource set.

The present disclosure provides a method in a third node for wireless communications, comprising:
transmitting a first signaling, the first signaling being used to determine a first time-frequency resource set;
herein, a receiver of the first signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

According to one aspect of the present disclosure, the above method is characterized in comprising:
transmitting a first-type signal;
herein, the first signaling comprises a configuration information set for the first-type signal; the configuration information set comprises at least one of occupied frequency-domain resources, occupied time-domain resources, a Modulation and Coding Status (MCS), a Redundancy Version (RV) or a Hybrid Automatic Repeat reQuest (HARQ) process ID; the first time-frequency resource set is used for transmitting the first-type signal.

In one embodiment, the first-type signal is a radio signal.
In one embodiment, the first-type signal is a baseband signal.

The present disclosure provides a method in a fourth node for wireless communications, comprising:
transmitting a second signaling, the second signaling being used for reserving the first time-frequency resource set;
herein, a receiver of the second signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

The present disclosure provides a first node for wireless communications, comprising:
a first receiver, performing channel detection in a first time window to determine a candidate time-frequency resource pool;
a second receiver, receiving a first signaling, the first signaling being used to determine a first time-frequency resource set;
a first transmitter, transmitting a target signaling, the target signaling being used to reserve a candidate time-frequency resource set;
herein, the candidate time-frequency resource pool comprises the candidate time-frequency resource set; time-domain resources occupied by the first time-frequency resource set belong to the first time window; the candidate time-frequency resource set is reserved for transmission of a first transport block (TB); whether the channel detection comprises a detection on the first time-frequency resource set is related to a type of the first TB, or whether the channel detection comprises a detection on the first time-frequency resource set is related to a duration of the first time window in time domain.

The present disclosure provides a second node for wireless communications, comprising:

a third receiver, receiving a target signaling, the target signaling being used for reserving a candidate time-frequency resource set;

herein, a transmitter of the target signaling performs channel detection in a first time window to determine a candidate time-frequency resource pool, and the candidate time-frequency resource set belongs to the candidate time-frequency resource pool; the transmitter of the target signaling also receives a first signaling, the first signaling being used to determine a first time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

The present disclosure provides a third node for wireless communications, comprising:

a second transmitter, transmitting a first signaling, the first signaling being used to determine a first time-frequency resource set;

herein, a receiver of the first signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

The present disclosure provides a fourth node for wireless communications, comprising:

a third transmitter, transmitting a second signaling, the second signaling being used for reserving the first time-frequency resource set;

herein, a receiver of the second signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the present disclosure has the following advantages compared with the prior art:

- associating time-frequency resources comprised by channel sensing, i.e., time-frequency resources comprised by the channel detection, with the type of the first TB or the length of the first time window, thus determining time-frequency resources actually belonging to channel sensing flexibly according to the type of the first TB, in avoidance of unsuitable time-frequency resources being introduced in sensing that may lead to inaccurate sensing result;
- when the first TB serves long-term scheduling and the first time-frequency resource set serves short-term scheduling, channel detection does not consider the effect of radio signals on the first time-frequency resource set, which will prevent the bad influence of burst traffics incurred on long-term traffics resource reservation, thus improving the spectrum efficiency; when the first TB serves short-term scheduling, it will require higher transmission reliability and the channel detection shall consider the effect of radio signals on the first time-frequency resource set, thereby improving the transmission robustness of the first TB;
- the first time-frequency resource set being over-written by the first signaling, or the first time-frequency resource set being pre-empted by the first signaling, so that whether the first time-frequency resource set is part of burst traffics becomes an influencing factor of whether it can be used as time-frequency resources for sensing, thus enhancing the accuracy and effectiveness of channel sensing;
- the second signaling being a long-term resource reservation indicator; the first signaling in the present disclosure re-schedules the first time-frequency resource set, or the first signaling pre-empts the first time-frequency resource set; and the first signaling is used to symbolize that what is currently transmitted on the first time-frequency resource set is either a short-term or a burst traffic.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
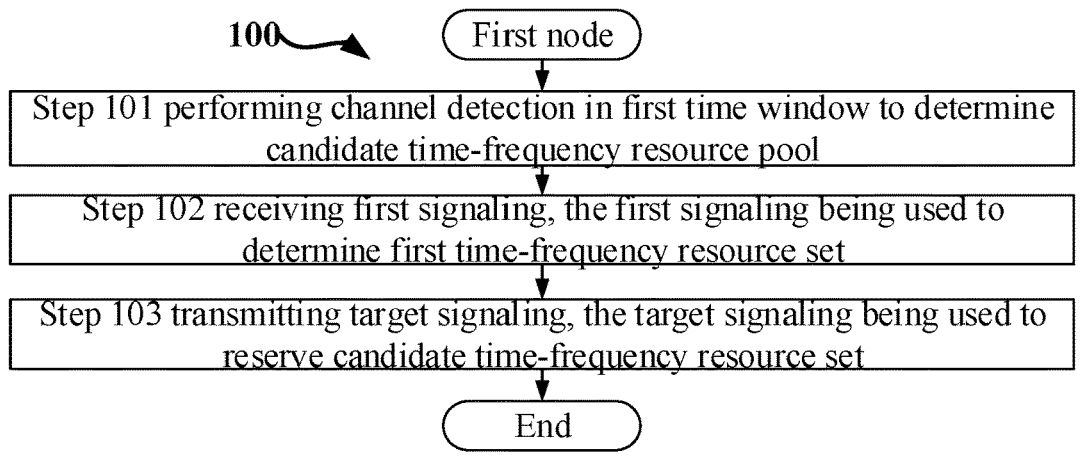
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, a first node in the present disclosure performs channel detection in a first time window in step 101, to determine a candidate time-frequency resource pool; and receives a first signaling in step 102, the first signaling being used to determine a first time-frequency resource set; and transmits a target signaling in step 103, the target signaling being used for reserving a candidate time-frequency resource set.

In Embodiment 1, the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the first time window is contiguous in time domain.

In one embodiment, the first time window comprises a positive integer number of slot(s).

In one embodiment, the first time window comprises a positive integer number of sub-slot(s).

In one embodiment, the candidate time-frequency resource pool occupies a positive integer number of sub-channel(s) in frequency domain.

In one embodiment, the candidate time-frequency resource pool occupies a positive integer number of Physical Resource Block(s) (PRB(s)) in frequency domain.

In one embodiment, frequency-domain resources occupied by the sub-channel in the present disclosure comprise frequency-domain resources corresponding to a positive integer number of PRB(s).

In one embodiment, the channel detection is a measurement of a Reference Signal Received Power (RSRP) of DMRS in a PSSCH.

In one embodiment, a result yielded by the channel detection is measured in dBm, or a result yielded by the channel detection is measured in mW.

In one embodiment, the channel detection is performed on M1 sub-channels, and frequency-domain resources occupied by the candidate time-frequency resource pool belong to one or more of the M1 sub-channels.

In one embodiment, time-domain resources occupied by the candidate time-frequency resource pool belong to a second time window, the second time window being orthogonal with the first time window in time domain.

In one embodiment, time-domain resources occupied by the candidate time-frequency resource pool belong to a second time window, the second time window comprising a positive integer number of slot(s).

In one embodiment, time-domain resources occupied by the candidate time-frequency resource pool belong to a second time window, the second time window comprising a positive integer number of sub-slot(s).

In one embodiment, the candidate time-frequency resource pool occupies a positive integer number of sub-channel(s) in frequency domain, and occupies a positive integer number of sub-slot(s) in time domain; or the candidate time-frequency resource pool occupies a positive integer number of sub-channel(s) in frequency domain, and occupies a positive integer number of slot(s) in time domain.

In one subembodiment, the positive integer number of sub-slots occupied by the candidate time-frequency resource pool in time domain are discrete.

In one subembodiment, the positive integer number of sub-slots occupied by the candidate time-frequency resource pool in time domain are consecutive.

In one subembodiment, the positive integer number of slots occupied by the candidate time-frequency resource pool in time domain are discrete.

In one subembodiment, the positive integer number of slots occupied by the candidate time-frequency resource pool in time domain are consecutive.

In one subembodiment, the candidate time-frequency resource pool occupies 1 sub-slot in time domain, or the candidate time-frequency resource pool occupies 1 slot in time domain.

In one embodiment, the first transport block is a TB.

In one embodiment, the first signaling is a piece of Sidelink Control Information (SCI).

In one embodiment, Cyclic Redundancy Check (CRC) comprised in the first signaling is scrambled by an Interruption Radio Network Temporary Identifier (INT-RNTI).

In one embodiment, CRC comprised in the first signaling is scrambled by a Sidelink (SL)-specific RNTI.

In one embodiment, the first signaling is used for preempting the first time-frequency resource set.

In one embodiment, the second signaling is used to determine that the first time-frequency resource set is reserved by the fourth node in the present disclosure, and the first signaling is used to indicate that the fourth node need not transmit any signal on the first time-frequency resource set.

In one embodiment, the second signaling is used to determine that the first time-frequency resource set is reserved by the fourth node in the present disclosure, and the first signaling is used to indicate that a fifth node need not demodulate signals on the first time-frequency resource set, the fifth node being included by a receiver of the first signaling.

In one embodiment, the first signaling is used for overwriting the second signaling in the present disclosure.

In one embodiment, the second signaling is used for scheduling a second-type signal; the first signaling is used for scheduling a first-type signal, or the first signaling is used for pre-empting the first-type signal; the first-type signal and the second-type signal are different.

In one subembodiment, the first-type signal and the second-type signal are respectively for transmissions of two different TBs.

In one subembodiment, the phrase that the first-type signal and the second-type signal are different means that the first-type signal and the second-type signal respectively correspond to different traffic types, the different traffic types correspond to different priorities, or the different traffic types correspond to different delay requests.

In one subembodiment, the first-type signal corresponds to traffics of Ultra Reliable Low Latency Communications (URLLC), while the second-type signal corresponds to traffics of Enhanced Mobile Broadband (eMBB).

In one subembodiment, traffics corresponding to the first-type signal are of a higher priority than traffics corresponding to the second-type signal.

In one subembodiment, traffics corresponding to the first-type signal are of a lower priority than traffics corresponding to the second-type signal.

In one subembodiment, delay requests of traffics corresponding to the first-type signal are shorter than delay requests of traffics corresponding to the second-type signal.

In one subembodiment, delay requests of traffics corresponding to the first-type signal are higher than delay requests of traffics corresponding to the second-type signal.

In one subembodiment, upon reception of the first signaling a receiver of the second-type signal drops demodulating the second-type signal in the first time-frequency resource set.

In one subembodiment, the first-type signal is a radio signal.

In one subembodiment, the first-type signal is a baseband signal.

In one subembodiment, the second-type signal is a radio signal.

In one subembodiment, the second-type signal is a baseband signal.

In one embodiment, the phrase that whether the channel detection comprises a detection on the first time-frequency resource set is related to a type of the first TB includes a meaning that the type of the first TB is a first type, and the channel detection comprises a detection on the first time-frequency resource set; or, the type of the first TB is a second type, and the channel detection comprises no detection on the first time-frequency resource set.

In one subembodiment, the phrase that the type of the first TB is the first type means that a duration of time-domain resources occupied by the first TB in time domain is smaller than a first threshold.

In one subembodiment, the phrase that the type of the first TB is the second type means that a duration of time-domain resources occupied by the first TB in time domain is no smaller than a first threshold.

In one subembodiment, the phrase that the type of the first TB is the first type means that a request for robustness of traffics corresponding to the first TB is higher than a second threshold.

In one subembodiment, the phrase that the type of the first TB is the first type means that a request for robustness of traffics corresponding to the first TB is no higher than a second threshold.

In one subembodiment, the phrase that the type of the first TB is the first type means that a request for delay of traffics corresponding to the first TB is no higher than a third threshold.

In one subembodiment, the phrase that the type of the first TB is the first type means that a request for delay of traffics corresponding to the first TB is higher than a third threshold.

In one embodiment, a first threshold in the present disclosure is measured in ms.

In one embodiment, a second threshold in the present disclosure is a Block Error Rate (BLER) threshold.

In one embodiment, a third threshold in the present disclosure is measured in ms.

In one embodiment, the phrase that whether the channel detection comprises a detection on the first time-frequency resource set is related to a duration of the first time window in time domain includes a meaning that a duration of the first time window in time domain is smaller than a fourth threshold, and the channel detection comprises a detection on the first time-frequency resource set; or a duration of the first time window in time domain is no smaller than a fourth threshold, and the channel detection comprises no detection on the first time-frequency resource set.

In one subembodiment, the fourth threshold in the present disclosure is measured in ms.

In one embodiment, the channel detection is performed on M1 sub-channels in the first time window, and the channel detection is a detection of PSSCH on the M1 sub-channels in the first time window.

In one subembodiment, the detection of the PSSCH on the M sub-channels is a detection of RSRP of DMRS based on the PSSCH.

In one embodiment, the target signaling is a piece of SCI.

Embodiment 2

Figure 2:
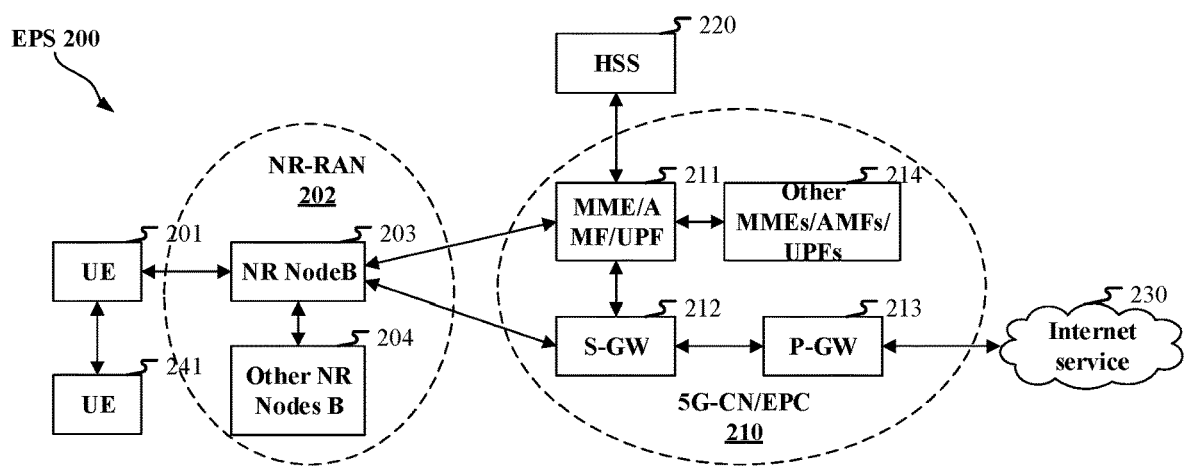
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, and a UE 241 in sidelink communication with the UE(s) 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the UE 241 corresponds to the third node in the present disclosure.

In one embodiment, the UE 241 corresponds to the fourth node in the present disclosure.

In one embodiment, an air interface between the UE 201 and the gNB 203 is a Uu interface.

In one embodiment, a radio link between the UE 201 and the gNB 203 is a cellular link.

In one embodiment, an air interface between the UE 201 and the UE 241 is a PC-5 interface.

In one embodiment, a radio link between the UE 201 and the UE 241 is a sidelink.

In one embodiment, the first node in the present disclosure is a terminal within the coverage of the gNB 203.

In one embodiment, the second node in the present disclosure is a terminal out of the coverage of the gNB 203.

In one embodiment, the first node and the second node are a V2X Pair.

In one embodiment, the first node and the second node are in unicast-based V2X communications.

In one embodiment, the first node and the second node are in groupcast-based V2X communications.

In one embodiment, the first node is an automobile.

In one embodiment, the second node is an automobile.

In one embodiment, the first node is a vehicle.

In one embodiment, the second node is a vehicle.

In one embodiment, the first node is a Road Side Unit (RSU).

In one embodiment, the second node is an RSU.

In one embodiment, multiple types of data transmissions are supported between the UE 201 and the UE 241.

In one embodiment, data transmissions with various performance indicators are supported between the UE 201 and the UE 241.

Embodiment 3

Figure 3:
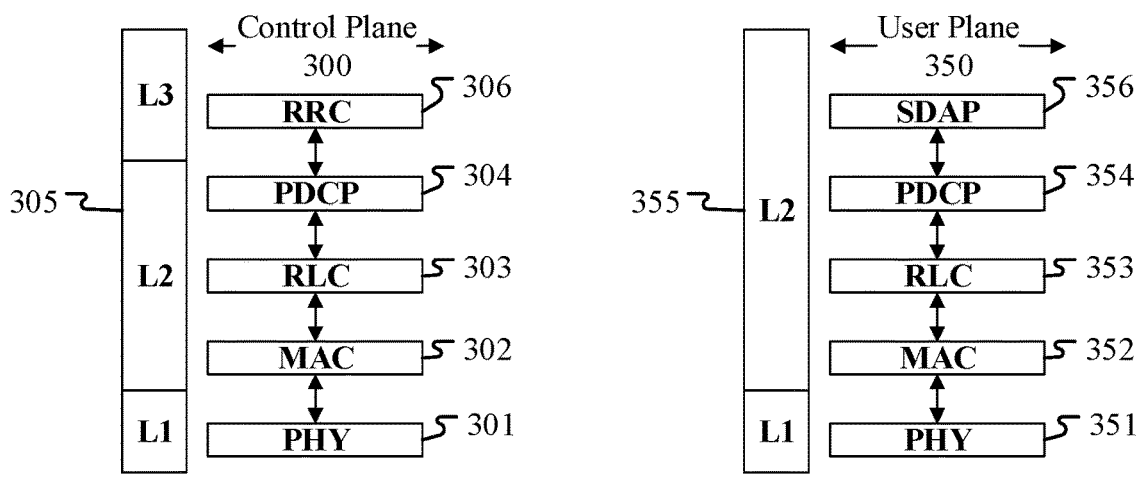
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling is generated by the PHY301, or by the PHY351.

In one embodiment, the target signaling is generated by the PHY301, or by the PHY351.

In one embodiment, the second signaling is generated by the PHY301, or by the PHY351.

In one embodiment, the first signaling is generated by the MAC352, or by the MAC302.

In one embodiment, the target signaling is generated by the MAC352, or by the MAC302.

In one embodiment, the second signaling is generated by the MAC352, or by the MAC302.

In one embodiment, the first signal is generated by the PHY301, or by the PHY351.

In one embodiment, the first signal is generated by the MAC352, or by the MAC302.

Embodiment 4

Figure 4:
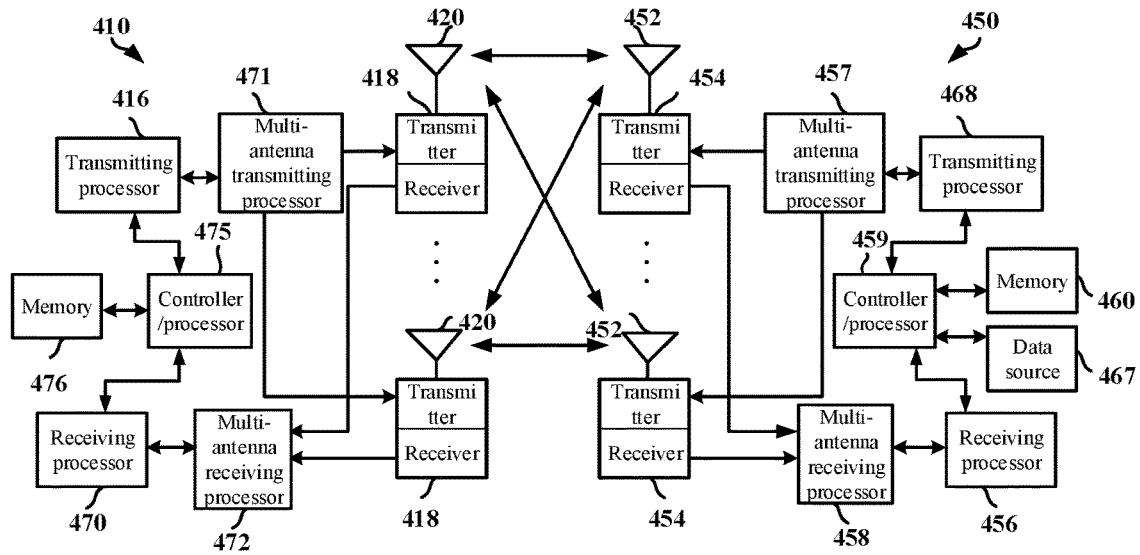
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least performs channel detection in a first time window to determine a candidate time-frequency resource pool; receives a first signaling, the first signaling being used to determine a first time-frequency resource set; and transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first transport block (TB); whether the channel detection comprises a detection on the first time-frequency resource set is related to a type of the first TB, or whether the channel detection comprises a detection on the first time-frequency resource set is related to a duration of the first time window in time domain.

In one embodiment, the first communication device 450 comprises a memory that stores a computer readable instruction program. The computer readable instruction program generates actions when executed by at least one processor. The actions include: performing channel detection in a first time window to determine a candidate time-frequency resource pool; receiving a first signaling, the first signaling being used to determine a first time-frequency resource set; and transmitting a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first transport block (TB); whether the channel detection comprises a detection on the first time-frequency resource set is related to a type of the first TB, or whether the channel detection comprises a detection on the first time-frequency resource set is related to a duration of the first time window in time domain.

In one embodiment, the second communication device 410 comprises at least one processor and at least one memory. The at least one memory comprises computer program codes. The at least one memory and the computer program codes are configured to be used in collaboration with the at least one processor. The second communication device 410 at least receives a target signaling, the target signaling being used for reserving a candidate time-frequency resource set; a transmitter of the target signaling performs channel detection in a first time window to determine a candidate time-frequency resource pool, and the candidate time-frequency resource set belongs to the candidate time-frequency resource pool; the transmitter of the target signaling also receives a first signaling, the first signaling being used to determine a first time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the second communication device 410 comprises a memory that stores a computer readable instruction program. The computer readable instruction program generates an action when executed by at least one processor. The action includes receiving a target signaling, the target signaling being used for reserving a candidate time-frequency resource set; a transmitter of the target signaling performs channel detection in a first time window to determine a candidate time-frequency resource pool, and the candidate time-frequency resource set belongs to the candidate time-frequency resource pool; the transmitter of the target signaling also receives a first signaling, the first signaling being used to determine a first time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling, the first signaling being used to determine a first time-frequency resource set; a receiver of the first signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the second communication device 410 comprises a memory that stores a computer readable instruction program. The computer readable instruction program generates an action when executed by at least one processor. The action includes transmitting a first signaling, the first signaling being used to determine a first time-frequency resource set; a receiver of the first signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a second signaling, the second signaling being used for reserving the first time-frequency resource set; a receiver of the second signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the second communication device 410 comprises a memory that stores a computer readable instruction program. The computer readable instruction program generates an action when executed by at least one processor. The action includes transmitting a second signaling, the second signaling being used for reserving the first time-frequency resource set; a receiver of the second signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the second communication device 410 corresponds to the fourth node in the present disclosure.

In one embodiment, the first communication device 450 is a UE.

In one embodiment, the second communication device 410 is a UE.

In one embodiment, at least one of the antenna 452, the receiver 454, the multi-antenna receiving processor 458, the receiving processor 456 or the controller/processor 459 is used for performing channel detection in a first time window to determine a candidate time-frequency resource pool.

In one embodiment, at least one of the antenna 452, the receiver 454, the multi-antenna receiving processor 458, the receiving processor 456 or the controller/processor 459 is used for receiving a first signaling, the first signaling being used to determine a first time-frequency resource set; at least one of the antenna 420, the transmitter 418, the multi-antenna transmitting processor 471, the transmitting processor 416 or the controller/processor 475 is used for transmitting a first signaling, the first signaling being used to determine a first time-frequency resource set.

In one embodiment, at least one of the antenna 452, the transmitter 454, the multi-antenna transmitting processor 457, the transmitting processor 468 or the controller/processor 459 is used for transmitting a target signaling, the target signaling being used for reserving a candidate time-frequency resource set; at least one of the antenna 420, the receiver 418, the multi-antenna receiving processor 472, the receiving processor 470 or the controller/processor 475 is used for receiving a target signaling, the target signaling being used for reserving a candidate time-frequency resource set.

In one embodiment, at least one of the antenna 452, the transmitter 454, the multi-antenna transmitting processor 457, the transmitting processor 468 or the controller/processor 459 is used for determining a candidate time-frequency resource set from a candidate time-frequency resource pool.

In one embodiment, at least one of the antenna 452, the receiver 454, the multi-antenna receiving processor 458, the receiving processor 456 or the controller/processor 459 is used for receiving a second signaling; at least one of the antenna 420, the transmitter 418, the multi-antenna transmitting processor 471, the transmitting processor 416 or the controller/processor 475 is used for transmitting a second signaling.

In one embodiment, at least one of the antenna 452, the transmitter 454, the multi-antenna transmitting processor 457, the transmitting processor 468 or the controller/processor 459 is used for transmitting a first signal; at least one of the antenna 420, the receiver 418, the multi-antenna receiving processor 472, the receiving processor 470 or the controller/processor 475 is used for receiving a target signaling, the target signaling being used for receiving a first signal.

Embodiment 5

Figure 5:
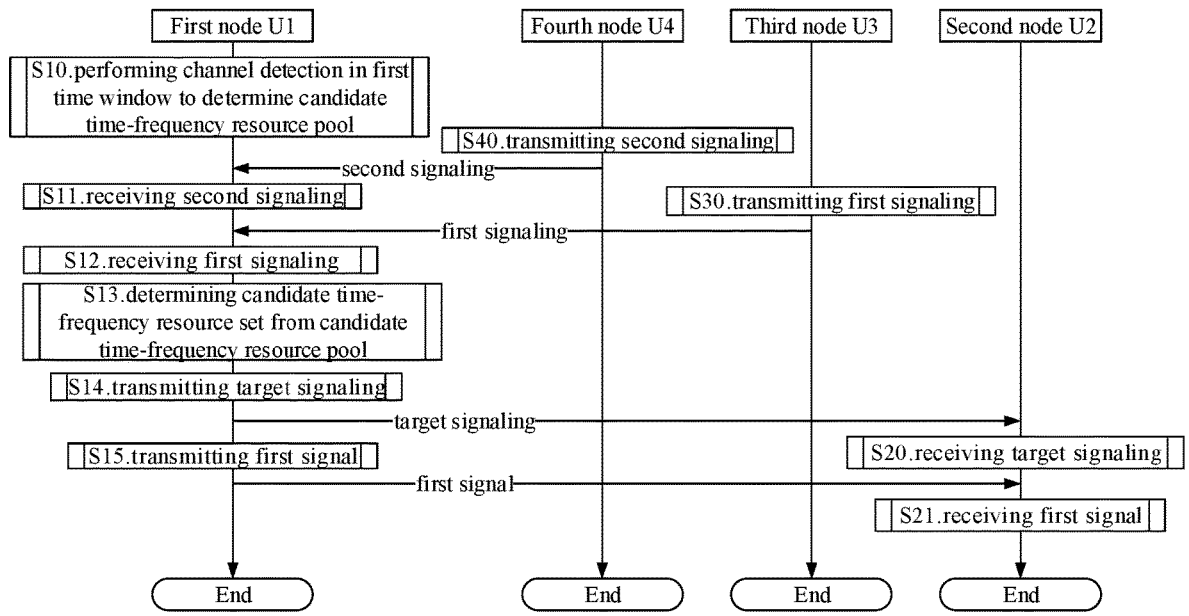
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node U2 are in communication via sidelink, a third node U3 and the first node U1 are in communication via sidelink, and a fourth node U4 and the first node U1 are in communication via sidelink.

The first node U1 performs channel detection in a first time window in step S10 to determine a candidate time-frequency resource pool; receives a second signaling in step S11; and receives a first signaling in step S12, the first signaling being used to determine a first time-frequency resource set; determines a candidate time-frequency resource set from a candidate time-frequency resource pool in step S13; transmits a target signaling in step S14, the target signaling being used for reserving a candidate time-frequency resource set; and transmits a first signal in step S15.

The second node U2 receives a target signaling in step S20, the target signaling being used for reserving a candidate time-frequency resource set; and receives a first signal in step S21.

The third node U3 transmits a first signaling in step S30, the first signaling being used to determine a first time-frequency resource set.

The fourth node U4 transmits a second signaling in step S40, the second signaling being used to determine a first time-frequency resource set.

In Embodiment 5, the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain; the candidate time-frequency resource pool comprises K1 second-type time-frequency resource sets, and the candidate time-frequency resource set is a best one of the K1 second-type time-frequency resource sets; the second signaling is used to determine a first time-frequency resource set; the first TB is used to generate the first signal, the first signal being transmitted in the candidate time-frequency resource set.

In one embodiment, the type of the first TB is related to a time-domain duration of the candidate time-frequency resource set.

In one subembodiment of the above embodiment, a duration of time-domain resources occupied by the candidate time-frequency resource set is smaller than a first threshold, and a type of the first TB is the first type in the present disclosure; or, a duration of time-domain resources occupied by the candidate time-frequency resource set is no smaller than a first threshold, and the type of the first TB is the second type in the present disclosure.

In one subembodiment of the above embodiment, the first threshold is measured in ms.

In one embodiment, time-domain resources occupied by the candidate time-frequency resource pool belong to a second time window, the candidate time-frequency resource pool comprises K1 second-type time-frequency resource sets, the K1 second-type time-frequency resource sets respectively corresponding to K1 first-type time-frequency resource sets, and time-domain resources occupied by the K1 first-type time-frequency resource sets belonging to the first time window.

In one subembodiment of the above embodiment, any of the K1 first-type time-frequency resource sets and a corresponding second-type time-frequency resource set occupy a same number of Resource Elements (REs).

In one subembodiment of the above embodiment, any of the K1 first-type time-frequency resource sets and a corresponding second-type time-frequency resource set occupy a same sub-channel.

In one subembodiment of the above embodiment, any of the K1 first-type time-frequency resource sets occupies one or more sub-channels in frequency domain.

In one subembodiment of the above embodiment, any of the K1 second-type time-frequency resource sets occupies one or more sub-channels in frequency domain.

In one subembodiment of the above embodiment, the first time window and the second time window are orthogonal in time domain, and the first time window is located before the second time window.

In one subembodiment of the above embodiment, channel detections for the K1 first-type time-frequency resource sets are used to determine that each of the K1 second-type time-frequency resource sets is available.

In one subsidiary embodiment of the above subembodiment, the phrase that each of the K1 second-type time-frequency resource sets is available means that an RSRP of a DMRS in a PSSCH detected on any one of the K1 second-type time-frequency resource sets is no higher than a first decision threshold.

In one subsidiary embodiment of the above subembodiment, the candidate time-frequency resource set corresponds to a given first-type time-frequency resource set among the K1 first-type time-frequency resource sets, the phrase that the candidate time-frequency resource set is a best one of the K1 second-type time-frequency resource sets means that an RSRP of a DMRS in a PSSCH detected on the given first-type time-frequency resource set is no greater than an RSRP of a DMRS in a PSSCH detected on any one of the K1 second-type time-frequency resource sets.

In one embodiment, frequency-domain resources occupied by the candidate time-frequency resource pool comprise K1 candidate sub-channels, and a result of channel detection of any sub-channel of the K1 candidate sub-channels in the first time window is no greater than the first decision threshold in the present disclosure.

In one embodiment, the first decision threshold in the present disclosure is measured in dBm, or is measured in mW.

In one embodiment, the channel detection is performed on M1 sub-channels in the first time window, and frequency-domain resources occupied by any of the K1 second-type time-frequency resource sets comprised by the candidate time-frequency resource pool belong to one or more of the M1 sub-channels.

In one embodiment, the second signaling is a piece of SCI.

In one embodiment, the second signaling is transmitted before the first signaling.

In one embodiment, the third node U3 and the fourth node U4 are two different terminals.

In one embodiment, the third node U3 and the fourth node U4 are non-Co-Located.

In one embodiment, the second signaling is a semi-persistent scheduling signaling.

In one embodiment, CRC comprised in the second signaling is scrambled by a sidelink Semi-Persistent Scheduling Radio Network Temporary Identifier (SPS-RNTI).

In one embodiment, a start time for transmission of the second signaling is earlier than a start time for transmission of the first signaling.

In one embodiment, the first signal is a radio signal.

In one embodiment, the first signal is a baseband signal.

In one embodiment, a physical layer channel occupied by the first signal includes a PSSCH.

In one embodiment, the target signaling comprises a configuration information set for the first signal; the configuration information set comprises at least one of occupied frequency-domain resources, occupied time-domain resources, an MCS, an RV, or a HARQ process ID.

In one embodiment, the action of receiving a first signaling comprises a blind detection of the first signaling.

In one embodiment, the action of receiving a first signaling comprises a coherent detection of the first signaling.

In one embodiment, the action of receiving a first signaling comprises sensing a position of time-frequency resources occupied by the first signaling through energy detection and demodulating the first signaling.

In one embodiment, the action of receiving a second signaling comprises a blind detection of the second signaling.

In one embodiment, the action of receiving a second signaling comprises sensing a position of time-frequency resources occupied by the second signaling through energy detection and demodulating the second signaling.

In one embodiment, the action of receiving a second signaling comprises a coherent detection of the second signaling.

Embodiment 6

Figure 6:
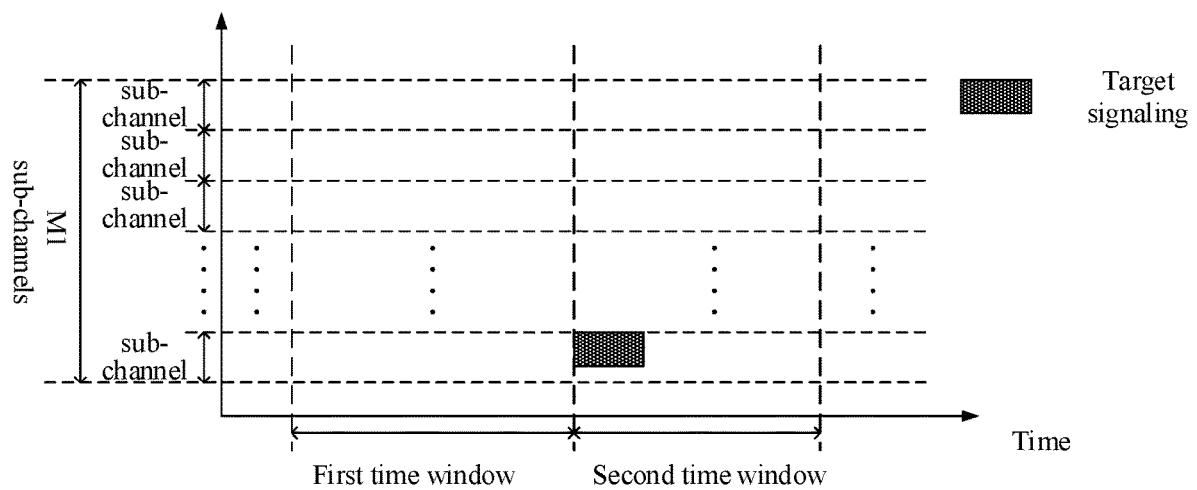
FIG. 6 illustrates a schematic diagram of a first time window and a target signaling according to one embodiment of the present disclosure.

Embodiment 6 illustrates a schematic diagram of a first time window and a target signaling, as shown in FIG. 6. In FIG. 6, the first node in the present disclosure performs channel detection on M1 sub-channels in the first time window, and a result of the channel detection is used in the illustrated second time window for scheduling transmission of the first TB in the present disclosure, the target signaling being used to schedule the first TB.

In one embodiment, the candidate time-frequency resource pool in the present disclosure comprises K1 second-type time-frequency resource sets, the K1 second-type time-frequency resource sets respectively occupy K1 sub-channels, and any of the K1 sub-channels belongs to the M1 sub-channels, K1 being no less than a product of M1 and 0.2, and an RSRP of a DMRS in a PSSCH on any one of the K1 sub-channels is no higher than the first decision threshold in the present disclosure; the first decision threshold is measured in dBm, or is measured in mW.

In one embodiment, the M1 sub-channels are orthogonal.

In one embodiment, any two of the M1 sub-channels occupy a same bandwidth.

In one embodiment, any of the M1 sub-channels occupies a bandwidth corresponding to a positive integer number of PRBs.

Embodiment 7

Figure 7:
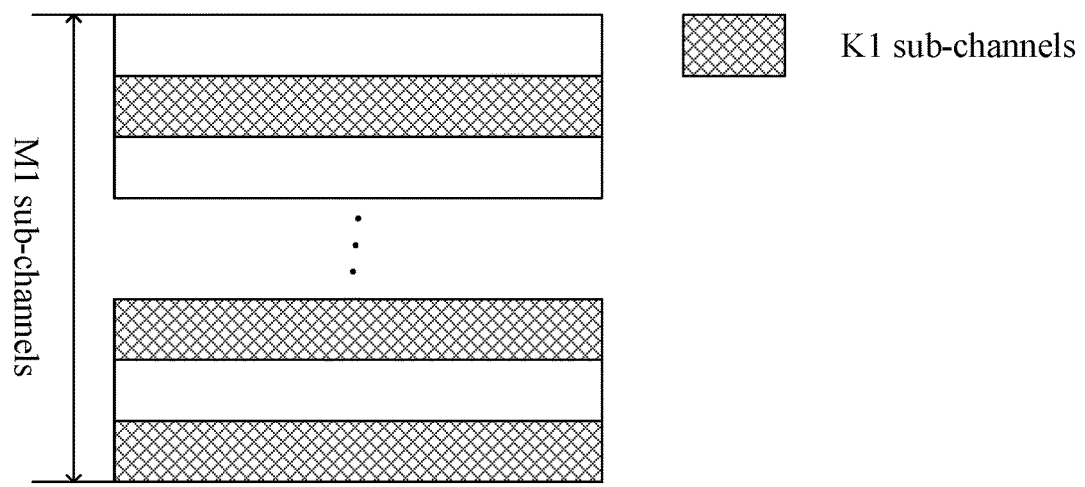
FIG. 7 illustrates a schematic diagram of M1 sub-channels according to one embodiment of the present disclosure.

Embodiment 7 illustrates a schematic diagram of M1 sub-channels, as shown in FIG. 7. In FIG. 7, K1 sub-channels among the M1 sub-channels constitute the candidate time-frequency resource pool in the present disclosure in the second time window in the present disclosure.

In one embodiment, frequency-domain resources occupied by the candidate time-frequency resource set in the present disclosure comprise one or more of the K1 sub-channels.

In one embodiment, frequency-domain resources occupied by the candidate time-frequency resource pool do not exceed frequency-domain resources occupied by the K1 sub-channels.

In one embodiment, the candidate time-frequency resource pool comprises the K1 sub-channels in frequency domain, and frequency-domain resources occupied by the candidate time-frequency resource set in the present disclosure are one or more of the K1 sub-channels.

Embodiment 8

Figure 8:
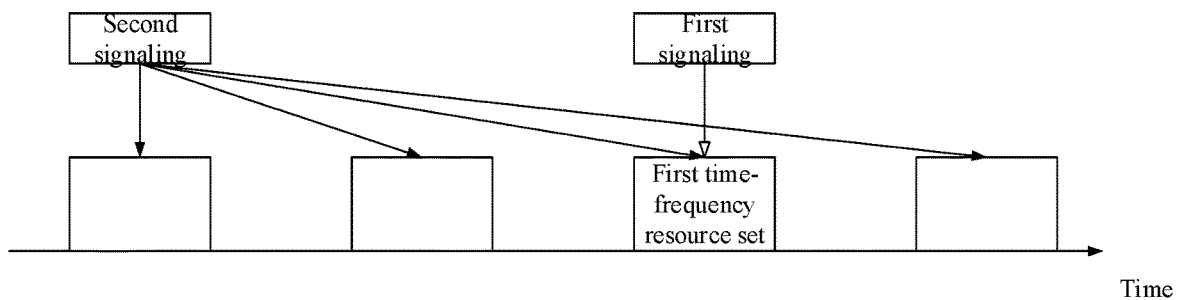
FIG. 8 illustrates a schematic diagram of a first signaling and a second signaling according to one embodiment of the present disclosure.

Embodiment 8 illustrates a schematic diagram of a first signaling and a second signaling, as shown in FIG. 8. In FIG. 8, the first signaling and the second signaling are both targeted at the first time-frequency resource set in the present disclosure; and a transmission of the first signaling is later than that of the second signaling.

In one embodiment, the first signaling is not used for indicating any time-frequency resource set other than the first time-frequency resource set.

In one embodiment, the second signaling is used for indicating multiple time-frequency resource sets, with the first time-frequency resource set being one of the multiple time-frequency resource sets.

Embodiment 9

Figure 9:
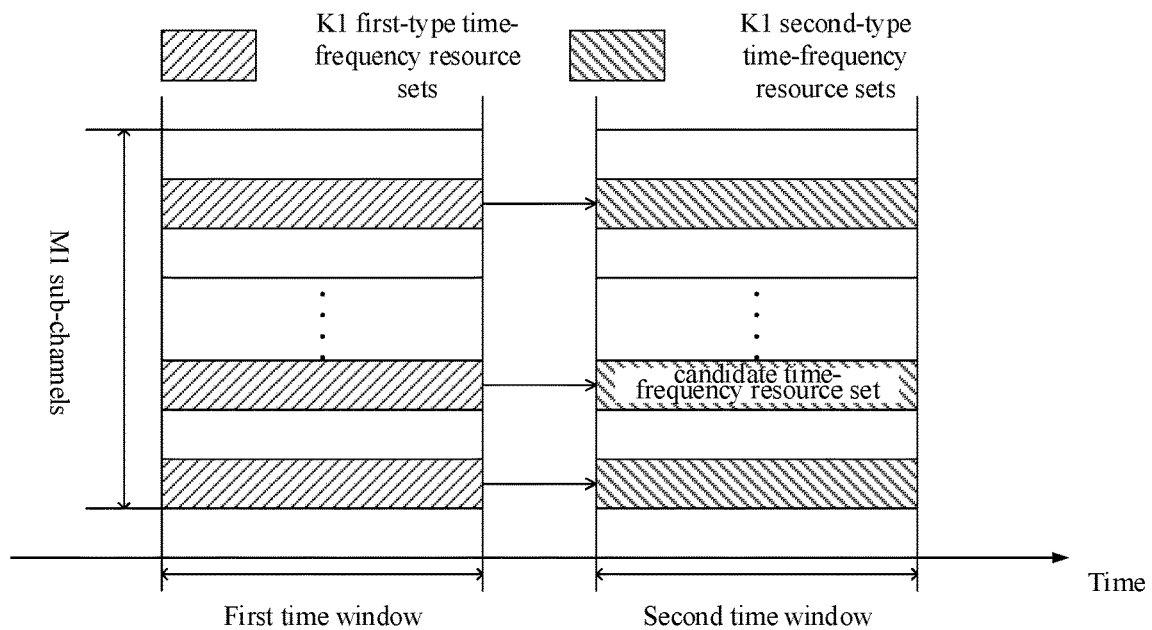
FIG. 9 illustrates a schematic diagram of a candidate time-frequency resource pool according to one embodiment of the present disclosure.

Embodiment 9 illustrates a schematic diagram of a candidate time-frequency resource pool, as shown in FIG. 9. In FIG. 9, channel detection on M1 sub-channels in a first time window is used to determine K1 first-type time-frequency resource sets, and the K1 first-type time-frequency resource sets are used to determine K1 second-type time-frequency resource sets in a second time window; the candidate time-frequency resource set in the present disclosure is one of the K1 second-type time-frequency resource sets, and the candidate time-frequency resource set is associated with a given first-type time-frequency resource set among the K1 first-type time-frequency resource sets, an RSRP of a DMRS detected on the given first-type time-frequency resource set being a smallest one among the K1 first-type time-frequency resource sets.

In one embodiment, the K1 first-type time-frequency resource sets respectively occupy the same sub-channels as the K1 second-type time-frequency resource sets.

In one embodiment, the M1 sub-channels constitute a Bandwidth Part (BWP).

In one embodiment, the M1 sub-channels constitute a Component Carrier (CC).

In one embodiment, the M1 sub-channels constitute a carrier.

Embodiment 10

Figure 10:
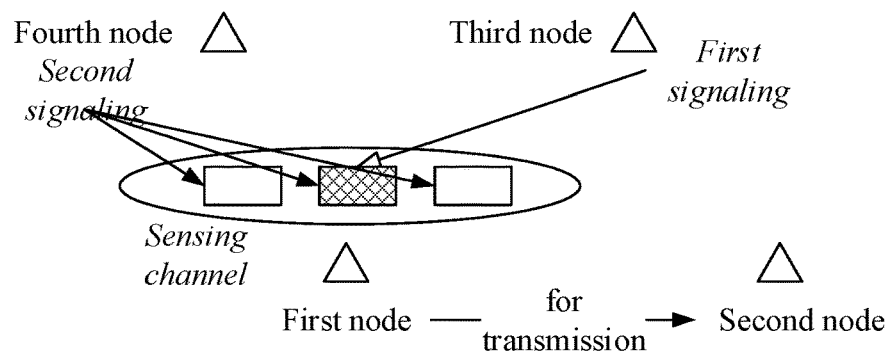
FIG. 10 illustrates a schematic diagram of an application scenario according to one embodiment of the present disclosure.

Embodiment 10 illustrates a schematic diagram of an application scenario, as shown in FIG. 10. In FIG. 10, a first node performs channel detection before communicating with a second node, through which a second signaling from a fourth node is detected, and determines a first time-frequency resource set reserved by the fourth node; then the first node detects a first signaling from a third node and determines that the first time-frequency resource set is pre-empted, or that the first time-frequency resource set is pre-empted by higher priority traffics; finally the first node determines according to the type of the first TB in the present disclosure whether it is necessary to calculate an RSRP of a DMRS detected in the first time-frequency resource set into channel detection; the rectangle filled with crosses in this figure corresponds to time-frequency resources occupied by the first time-frequency resource set.

In one embodiment, a signal transmitted by the third node on the first time-frequency resource set is of a higher priority than a signal transmitted by the fourth node on the first time-frequency resource set.

In one embodiment, a signal transmitted by the third node on the first time-frequency resource set has a shorter delay request than a signal transmitted by the fourth node on the first time-frequency resource set.

In one embodiment, the third node and the fourth node are a same terminal device.

Embodiment 11

Figure 11:
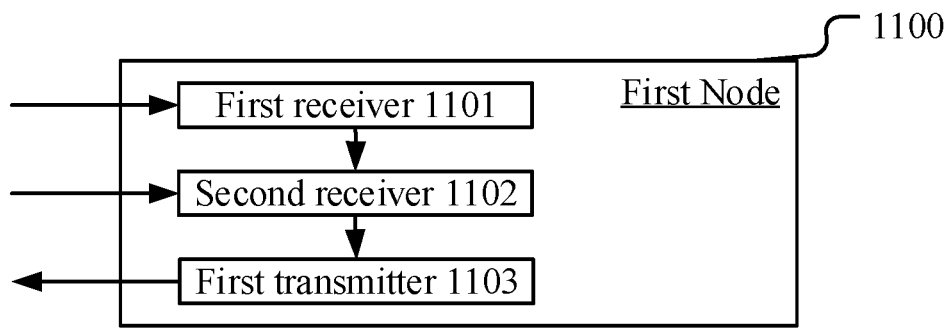
FIG. 11 illustrates a structure block diagram used in a first node according to one embodiment of the present disclosure.

Embodiment 11 illustrates a structure block diagram used in a first node, as shown in FIG. 11. In FIG. 11, a first node 1100 comprises a first receiver 1101, a second receiver 1102 and a first transmitter 1103.

The first receiver 1101 performs channel detection in a first time window to determine a candidate time-frequency resource pool;

the second receiver 1102 receives a first signaling, the first signaling being used to determine a first time-frequency resource set;

the first transmitter 1103 transmits a target signaling, the target signaling being used to reserve a candidate time-frequency resource set.

In Embodiment 11, the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the type of the first TB is related to a time-domain duration of the candidate time-frequency resource set.

In one embodiment, the first transmitter 1103 determines the candidate time-frequency resource set from the candidate time-frequency resource pool; the candidate time-frequency resource pool comprises K1 second-type time-frequency resource sets, and the candidate time-frequency resource set is a best one of the K1 second-type time-frequency resource sets.

In one embodiment, the second receiver 1102 receives a second signaling; the second signaling is used for reserving the first time-frequency resource set.

In one embodiment, the first transmitter 1103 transmits a first signal; the first TB is used to generate the first signal, the first signal being transmitted in the candidate time-frequency resource set.

In one embodiment, the first receiver 1101 comprises at least the first four of the antenna 452, the receiver 454, the multi-antenna receiving processor 458, the receiving processor 456 and the controller/processor 459 in Embodiment 4.

In one embodiment, the second receiver 1102 comprises at least the first four of the antenna 452, the receiver 454, the multi-antenna receiving processor 458, the receiving processor 456 and the controller/processor 459 in Embodiment 4.

In one embodiment, the first transmitter 1103 comprises at least the first four of the antenna 452, the transmitter 454, the multi-antenna transmitting processor 457, the transmitting processor 468 and the controller/processor 459 in Embodiment 4.

Embodiment 12

Figure 12:
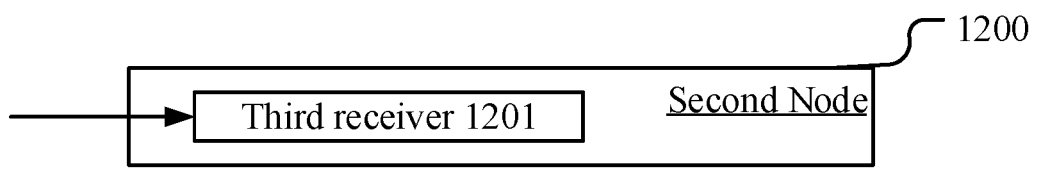
FIG. 12 illustrates a structure block diagram used in a second node according to one embodiment of the present disclosure.

Embodiment 12 illustrates a structure block diagram used in a second node, as shown in FIG. 12. In FIG. 12, a second node comprises a third receiver 1201.

The third receiver 1201 receives a target signaling, the target signaling being used to reserve a candidate time-frequency resource set.

In Embodiment 12, a transmitter of the target signaling performs channel detection in a first time window to determine a candidate time-frequency resource pool, and the candidate time-frequency resource set belongs to the candidate time-frequency resource pool; the transmitter of the target signaling also receives a first signaling, the first signaling being used to determine a first time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the type of the first TB is related to a time-domain duration of the candidate time-frequency resource set.

In one embodiment, the candidate time-frequency resource pool comprises K1 second-type time-frequency resource sets, and the candidate time-frequency resource set is a best one of the K1 second-type time-frequency resource sets.

In one embodiment, the third receiver 1201 receives a first signal; the first TB is used to generate the first signal, the first signal being transmitted in the candidate time-frequency resource set.

In one embodiment, the third receiver 1201 comprises at least the first four of the antenna 420, the receiver 418, the multi-antenna receiving processor 472, the receiving processor 470 and the controller/processor 475 in Embodiment 4.

Embodiment 13

Figure 13:
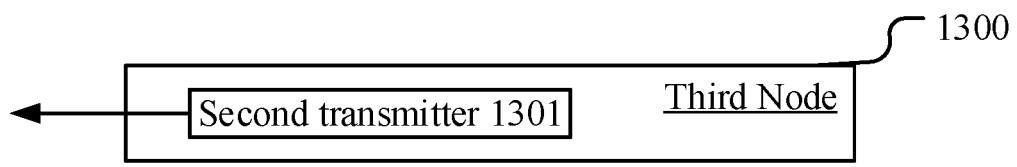
FIG. 13 illustrates a structure block diagram used in a third node according to one embodiment of the present disclosure.

Embodiment 13 illustrates a structure block diagram used in a third node, as shown in FIG. 13. In FIG. 13, a third node 1300 comprises a second transmitter 1301.

The second transmitter 1301 transmits a first signaling, the first signaling being used to determine a first time-frequency resource set.

In Embodiment 13, a receiver of the first signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the type of the first TB is related to a time-domain duration of the candidate time-frequency resource set.

In one embodiment, the second transmitter 1301 comprises at least the first four of the antenna 420, the transmitter 418, the multi-antenna transmitting processor 471, the transmitting processor 416 and the controller/processor 475 in Embodiment 4.

Embodiment 14

Figure 14:
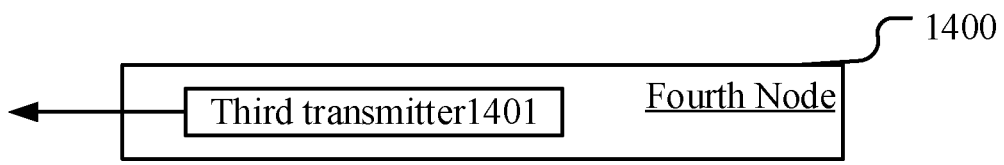
FIG. 14 illustrates a structure block diagram used in a fourth node according to one embodiment of the present disclosure.

Embodiment 14 illustrates a structure block diagram used in a fourth node, as shown in FIG. 14. In FIG. 14, a fourth node comprises a third transmitter 1401.

The third transmitter 1401 transmits a second signaling, the second signaling being used for reserving the first time-frequency resource set.

In Embodiment 14, a receiver of the second signaling comprises a first node, the first node performing channel detection in a first time window to determine a candidate time-frequency resource pool; and the first node transmits a target signaling, the target signaling being used to reserve a candidate time-frequency resource set; the candidate time-frequency resource pool comprises the candidate time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

In one embodiment, the type of the first TB is related to a time-domain duration of the candidate time-frequency resource set.

In one embodiment, the third transmitter 1401 comprises at least the first four of the antenna 420, the transmitter 418, the multi-antenna transmitting processor 471, the transmitting processor 416 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A first node for wireless communications, comprising:
a first receiver, performing channel detection in a first time window to determine a candidate time-frequency resource pool;
a second receiver, receiving a first signaling, the first signaling being used to determine a first time-frequency resource set;
a first transmitter, transmitting a target signaling, the target signaling being used to reserve a candidate time-frequency resource set;
wherein the candidate time-frequency resource pool comprises the candidate time-frequency resource set; time-domain resources occupied by the first time-frequency resource set belong to the first time window; the candidate time-frequency resource set is reserved for transmission of a first transport block (TB); whether the channel detection comprises a detection on the first time-frequency resource set is related to a type of the first TB, or whether the channel detection comprises a detection on the first time-frequency resource set is related to a duration of the first time window in time domain.

2. The first node according to claim 1, wherein the type of the first TB is related to a duration of the candidate time-frequency resource set in time domain.

3. The first node according to claim 1, wherein the first transmitter determines the candidate time-frequency resource set from the candidate time-frequency resource pool; the candidate time-frequency resource pool comprises K1 second-type time-frequency resource sets, and the candidate time-frequency resource set is a best one of the K1 second-type time-frequency resource sets.

4. The first node according to claim 1, wherein the second receiver receives a second signaling; the second signaling is used for reserving the first time-frequency resource set.

5. The first node according to claim 1, wherein the first transmitter transmits a first signal; the first TB is used to generate the first signal, the first signal being transmitted in the candidate time-frequency resource set.

6. The first node according to claim 1, wherein the phrase that whether the channel detection comprises a detection on the first time-frequency resource set is related to a type of the first TB means that: the type of the first TB is a first type, and the channel detection comprises a detection on the first time-frequency resource set; or, the type of the first TB is a second type, and the channel detection does not comprise a detection on the first time-frequency resource set; the type of the first TB being the first type means that a duration of time-domain resources occupied by the first TB in time domain is smaller than a first threshold; while the type of the first TB being the second type means that a duration of time-domain resources occupied by the first TB in time domain is no smaller than a first threshold.

7. The first node according to claim 1, wherein the phrase that whether the channel detection comprises a detection on the first time-frequency resource set is related to a duration of the first time window in time domain means that the duration of the first time window in time domain is smaller than a fourth threshold, and the channel detection comprises the detection on the first time-frequency resource set; or the duration of the first time window in time domain is no smaller than a fourth threshold, and the channel detection does not comprise the detection on the first time-frequency resource set; the fourth threshold is measured in milliseconds (ms).

8. The first node according to claim 1, wherein the first node performs channel detection on M1 sub-channels in the first time window, M1 being a positive integer greater than K1; a result yielded by the channel detection is used for transmission of the first TB, the candidate time-frequency resource pool comprises K1 second-type time-frequency resource sets, and the K1 second-type time-frequency resource sets respectively occupy K1 sub-channels, any sub-channel among the K1 sub-channels belongs to the M1 sub-channels, K1 being no less than a product of M1 and 0.2, and an RSRP of DMRS in a PSSCH on any of the K1 sub-channels is no higher than a first decision threshold; the first decision threshold is measured in dBm, or the first decision threshold is measured in mW.

9. The first node according to claim 4, wherein the first signaling is used for pre-empting the first time-frequency resource set, or the first signaling is used for covering the second signaling.

10. The first node according to claim 4, wherein the second signaling is used to indicate multiple time-frequency resource sets, and the first time-frequency resource set is one of the multiple time-frequency resource sets; the first signaling indicates the first time-frequency resource set; and transmission of the first signaling is later than transmission of the second signaling.

11. The first node according to claim 4, wherein the second signaling is used to schedule a second-type signal; the first signaling is used to schedule a first-type signal, or the first signaling is used for pre-empting the first-type signal; services corresponding to the first-type signal are of a higher priority than services corresponding to the second-type signal.

12. The first node according to claim 4, wherein a transmitter of the first signaling is different from a transmitter of the second signaling.

13. A second node for wireless communications, comprising:
a third receiver, receiving a target signaling, the target signaling being used for reserving a candidate time-frequency resource set;
wherein a transmitter of the target signaling performs channel detection in a first time window to determine a candidate time-frequency resource pool, and the candidate time-frequency resource set belongs to the candidate time-frequency resource pool; the transmitter of the target signaling also receives a first signaling, the first signaling being used to determine a first time-frequency resource set; time-domain resources occupied by the first time-frequency resource set belong to the first time window; the candidate time-frequency resource set is reserved for transmission of a first TB; whether the channel detection comprises a detection on the first time-frequency resource set is related to a type of the first TB, or whether the channel detection comprises a detection on the first time-frequency resource set is related to a duration of the first time window in time domain.

14. The second node according to claim 13, wherein the type of the first TB is related to a duration of the candidate time-frequency resource set in time domain.

15. The second node according to claim 13, wherein the candidate time-frequency resource pool comprises K1 second-type time-frequency resource sets, and the candidate time-frequency resource set is a best one of the K1 second-type time-frequency resource sets.

16. The second node according to claim 13, wherein the third receiver receives a first signal; the first TB is used to generate the first signal, the first signal being transmitted in the candidate time-frequency resource set.

17. The second node according to claim 13, wherein the phrase that whether the channel detection comprises a detection on the first time-frequency resource set is related to a type of the first TB means that: the type of the first TB is a first type, and the channel detection comprises a detection on the first time-frequency resource set; or, the type of the first TB is a second type, and the channel detection does not comprise a detection on the first time-frequency resource set; the type of the first TB being the first type means that a duration of time-domain resources occupied by the first TB in time domain is smaller than a first threshold; while the type of the first TB being the second type means that a duration of time-domain resources occupied by the first TB in time domain is no smaller than a first threshold.

18. The second node according to claim 13, wherein the phrase that whether the channel detection comprises a detection on the first time-frequency resource set is related to a duration of the first time window in time domain means that the duration of the first time window in time domain is smaller than a fourth threshold, and the channel detection comprises the detection on the first time-frequency resource set; or the duration of the first time window in time domain is no smaller than a fourth threshold, and the channel detection does not comprise the detection on the first time-frequency resource set; the fourth threshold is measured in milliseconds (ms).

19. A method in a first node for wireless communications, comprising:
- performing channel detection in a first time window to determine a candidate time-frequency resource pool;
- receiving a first signaling, the first signaling being used to determine a first time-frequency resource set; and
- transmitting a target signaling, the target signaling being used to reserve a candidate time-frequency resource set;
- wherein the candidate time-frequency resource pool comprises the candidate time-frequency resource set; time-domain resources occupied by the first time-frequency resource set belong to the first time window; the candidate time-frequency resource set is reserved for transmission of a first transport block (TB); whether the channel detection comprises a detection on the first time-frequency resource set is related to a type of the first TB, or whether the channel detection comprises a detection on the first time-frequency resource set is related to a duration of the first time window in time domain.

20. The method according to the claim 19, wherein the type of the first TB is related to a duration of the candidate time-frequency resource set in time domain.

* * * * *